Patented Jan. 20, 1942

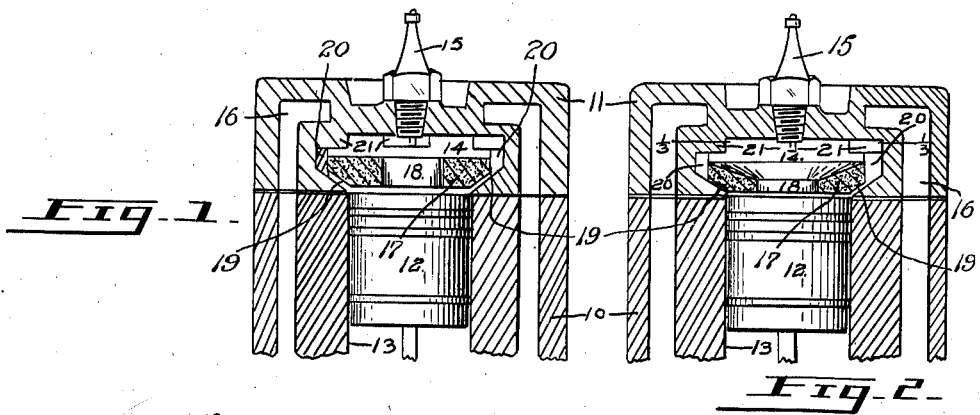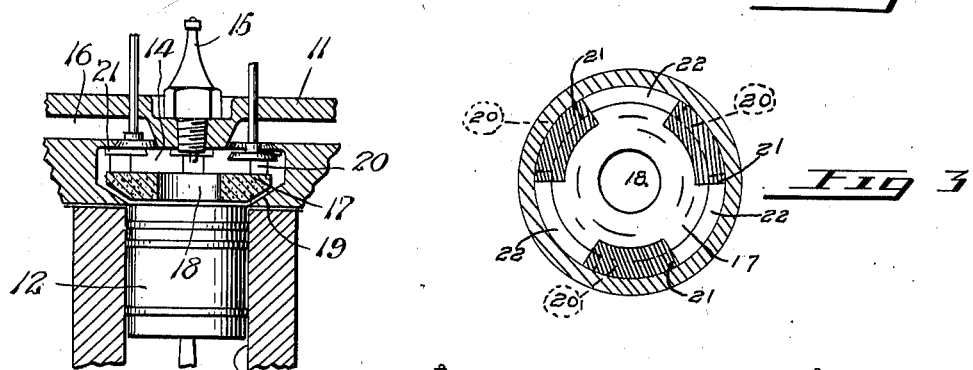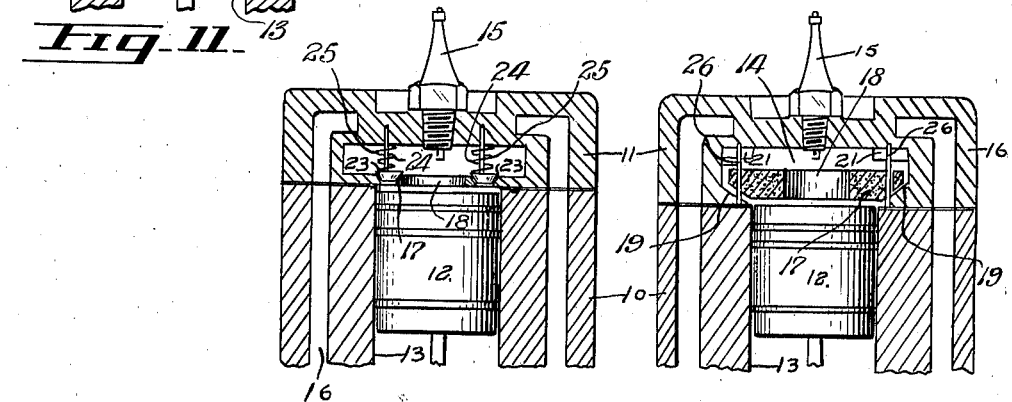

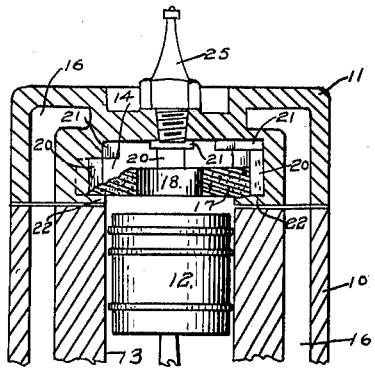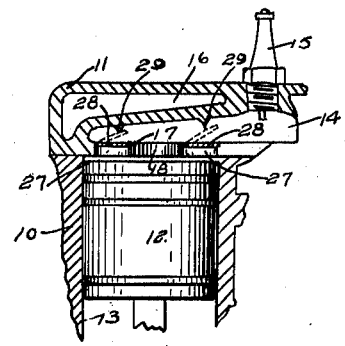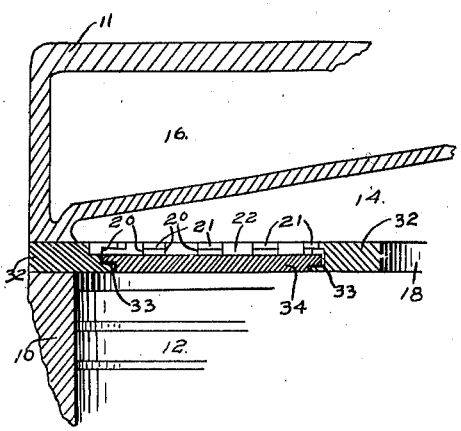

2,270,231

UNITED STATES PATENT OFFICE 2,270,231

INTERNAL COMBUSTION ENGINE

John M. Robertson, Ottawa, Ontario, Canada

Application October 8, 1940, Serial No. 360,322

5 Claims. (Cl. 123—191)

This invention relates to internal combustion engines and particularly to an improved combustion chamber.

The principal object of this invention is to confine and centralize the expanding gases in the combustion chamber upon the piston head so that greater power is obtained from the explosive gases during the power stroke of the piston.

Another important object of the invention is to provide means whereby the burned gases may be readily expelled from the combustion chamber during the exhaust stroke of the engine.

Still another object of the invention is to prevent cylinder oil from entering the combustion chamber with a consequent reduction in firing efficiency of the spark plug.

To this end I provide a plate located between the cylinder and the combustion chamber or it may be more properly considered to be seated in the combustion chamber immediately above the upper periphery of the cylinder. In the plate is a confined aperture located centrally of the piston head in the cylinder so that a restricted communication is provided between the combustion chamber and the piston head.

By actual test, under normal operating conditions of an internal combustion motor it has been found that greatly increased efficiency of the motor is obtained by means of the aforementioned plate which confines and centralizes the exploding gases on the piston head.

The increased efficiency was especially noticeable at low speeds with a proportionately reduced efficiency as the speed of the motor was increased. Subsequent experiment elicited the fact that the restricted passageway in the plate prevented the proper expulsion of the waste gases from the cylinder. With this in view I have provided channels leading from the cylinder to the combustion chamber which are controlled by the reciprocating action of the plate which is in turn actuated by the piston on the said pistons downstroke and upstroke.

Modifications of this principle are also illustrated, in which the primary feature, of restricting the expanding gases upon the piston head and allowing clear passage for the expulsion of waste gases is carried out throughout the several views.

With the above noted and other objects in view which may appear as the description proceeds the invention resides in the novel construction, combination and arrangement of co-operating parts as hereinafter more specifically set forth, claimed and shown in the accompanying drawings forming part of this application and in which:

Fig. 1 is a fragmentary sectional view of an internal combustion engine showing my invention located in the combustion chamber.

Fig. 2 illustrates a view similar to Fig. 1, showing a slightly modified plate.

Fig. 3 is a plan view taken on the line 3—3 of Fig. 2.

Fig. 4 is a fragmentary sectional view similar to Fig. 1, illustrating a discharge valve for the expulsion of waste gases.

Fig. 5 illustrates a further modification of the plate.

Fig. 6 illustrates a modification of the seating for the plate.

Fig. 7 is a fragmentary sectional view of an L type cylinder head with an adaptation of my invention located therein.

Fig. 8 is a fragmentary sectional view along the line 8—8 of Fig. 9;

Fig. 9 is a fragmentary sectional view of an L type cylinder head with a further adaptation of my invention located therein.

Fig. 10 is a further modification of the device.

Fig. 11 is a fragmentary sectional view of a combustion chamber showing the arrangement of the usual intake and exhaust valves for admitting and exhausting gases to and from the chamber of a cylinder such as shown in Figs. 1 to 6 inclusive.

Fig. 12 is a view similar to Fig. 11 showing the arrangement of the valves for a cylinder of the type shown in Figs. 7 to 10 inclusive.

Referring more in detail to the drawings in which similar reference characters designate corresponding parts throughout the several views, 10 is the cylinder block, and 11 the cylinder head. The piston 12 is located in the cylinder 13, and is actuated by the exploding gases in the combustion chamber 14, which is ignited by the spark plug 15. Both the cylinder block and the cylinder head are cooled by means of the water jacket 16.

The invention broadly described consists of a plate designated as 17 having a restricted aperture 18 therethrough so that the expanding gases in the combustion chamber 14 are directed centrally of the piston head 12 and confined in a relatively small area to increase the explosive force of the said gases. Another primary feature of the invention in combination with the restricted opening is means whereby the waste gases may be readily expelled from the cylinder at the exhaust stroke of the engine to be hereinafter described in detail.

In the drawings Figs. 1, 2 and 3 illustrate the plate 17 on a bevelled seat 19 and located centrally over the cylinder 17 by means of extending flanges 20 which prevent lateral movement of the plate 17, without restricting a reciprocating movement upward and downward in the combustion chamber. The said upward and downward movement is limited by the seat 19, and stop blocks 21 in the combustion chamber. Fig. 6 shows a similar arrangement as shown in Figs. 1, 3, respectively except for the fact that the plate 17 is not bevelled and is seated on a flat flange member 22 of the cylinder head 11. In Fig. 3, the aperture 18 is countersunk so that a funnel-like opening is provided whereby the gases are directed to the aperture proper.

Careful analysis of the foregoing discloses the fact that on the downstrokes of the piston the plate is forced to the seating by the exploding gases and on the up strokes the plate is raised against the stop blocks 21. Between the flanges 20 are channels 22, so that a plurality of communicating passages are located between the periphery of the plate 17, and the side walls of the combustion chamber 14, which are automatically open when the plate is raised and likewise automatically closed when the plate is lowered to the seating which is uninterrupted about the periphery of the cylinder.

In this manner I have obtained a restricted opening as described and for the purpose specified above, during the power stroke of the piston while allowing free expulsion of the waste gases on the exhaust stroke of the piston.

In the modified device shown in Fig. 4, the plate 17 is stationary and formed integral with the cylinder head 11. The waste gases are expelled through the restricted opening 18, and through ports 23, which are controlled by valves 24. The valves are normally retained on the valve seat of the port 23 by means of springs 25 and are opened by pressure derived from the upstroke of the piston 12, so that a greater passage for the waste gases is obtained and a restricted passage for the volatile gas at the explosion point is likewise obtained.

In Fig. 5, the plate 17 is slidably retained in position by means of rods 26. In this case I do not employ flanges around the walls of the combustion chamber. The waste gases have an uninterrupted flow between the periphery of the plate 17, and the walls of the combustion chamber when the said plate is raised off its seat against the stop blocks 21, which are for the purpose of protecting the spark plug which extends into the combustion chamber.

Referring now to Fig. 7, which illustrates an L-shaped engine head certain structural modifications are necessary. The shallow depth of the combustion chamber necessitates a stationary type of plate 17 having the restricted opening 18, but it is obviously necessary to provide means for the expulsion of waste gas other than the said opening. To accomplish this object I locate apertures 27 in the plate which are controlled by flap valves 28 arranged to open at the upstroke of the piston and to close at the down stroke of the piston. The said flap valves are limited in movement in that I locate tits 29 in the engine head so that they may open a predetermined distance only.

In Figs. 8 and 9, the ports 27 are controlled by floating valves 30 which are raised from the beveled seating 31 at the upstroke of the piston whereupon the waste gases swirl out through the space between the wall of the port and the wall of the valve. The valves are prevented from rising above the upper periphery of the port by means of the tits 29 and are forced to the seating by the expanding gases at the explosion point of the engine.

A modification of the reciprocating movement of the plate is illustrated in Fig. 10, in which instance the valves reciprocate, or are raised off their seating at the upstroke of the piston and are driven to their seating at the explosion point. The metal section 32 is inserted between the cylinder block 10, and the cylinder head 11. The said section has the aperture 18 located centrally over the piston head and a plurality of ports arranged around the said aperture similar to the arrangement shown in Fig. 8. The valves 34 are located on the annular seatings 33 of the metal section 32. I also provide flanges 20, and stop blocks 21, spaced at intervals around the valve port and formed integral with the metal section 32.

It will be seen the device performs much the same function as the device described according to Figs. 1-3 respectively, in the present case it is not the plate which reciprocates on the seating but the valves in the plate which reciprocate. That is when the valves 34 rest on their seating 33, the restricted opening 18 provides the only communication from the combustion chamber 14 to the piston 12. At the exhaust stroke of the engine the plate 34 is raised from its seating 33, against the stop blocks 21, so that a plurality of passageways for the expulsion of the waste gases are obtained in the channels 22, between the flanges 21.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. An improvement in internal combustion engines, comprising in combination with a cylinder, a piston in the cylinder, a cylinder head and combustion chamber in the cylinder head, a relatively thin plate closing the combustion chamber from the cylinder, an aperture in the plate located centrally over the piston in the cylinder, said aperture providing a restricted opening leading from the combustion chamber to the cylinder, a seat for the plate in the combustion chamber and a passage located between the periphery of the plate and the combustion chamber walls, said passage being closed when the plate is on its seating and opened when the plate is raised from the seating.

2. An improvement in internal combustion engines, comprising in combination with a cylinder, a piston in the cylinder, a cylinder head and a combustion chamber in the cylinder head, a relatively thin plate interposed between the cylinder and combustion chamber, a seating for the plate immediately above the cylinder, rods in the combustion chamber on which the plate is slidably secured over the cylinder, an aperture in the plate located centrally of the piston in the cylinder, said aperture providing a restricted opening from the combustion chamber to the cylinder, stop blocks to limit the upward movement of the plate, an annular space between the periphery of the plate and the walls of the combustion chamber so that an annular passage is obtained from the cylinder to the combustion chamber when the plate is raised from the seating, said passage being closed when the plate is on the seating, said annular passage being supplemented to the restricted opening located centrally over the piston in the said plate.

3. An improvement in internal combustion engines, comprising in combination with a cylinder, a piston in the cylinder, a cylinder head and a combustion chamber in the cylinder head, a plate between the combustion chamber and the cylinder, an aperture in the plate, said aperture providing a restricted communication between the combustion chamber and the cylinder, a seating for the plate in the combustion chamber, flanges extending from the walls of the combustion chamber to the periphery of the plate, said flanges slidably retaining the plate in an aligned condition with respect to the dead centre of the piston, stop blocks to limit the upward movement of the plate, channels between the said flanges so that passages are provided from the cylinder to the combustion chamber between the periphery of the plate and the walls of the combustion chamber, at the channels, said passages being closed when the plate is on the seating and open when the plate is raised from the seating, the passages being supplemental to the restricted opening located centrally over the piston on the said plate.

4. The combination with the cylinder of an internal combustion engine having a piston mounted therein and a combustion chamber above the cylinder, of an annular seat surrounding the combustion chamber, a circular plate supported on said seat having a central aperture of less diameter than the cylinder and located axially thereof, said plate being adapted to be moved vertically by the pressure created by the upstroke of the piston whereby a passage around the periphery of the plate is provided when said plate is raised from its seat.

5. The combination with the cylinder of an internal combustion engine having a piston mounted therein and a combustion chamber above the cylinder, of an annular seat surrounding the combustion chamber at its jointure with the cylinder, a circular plate normally supported on said seat having a central aperture of less diameter than the cylinder and located axially thereof, and guide rods extending upwardly from said seat through passages in said plate for guiding the vertical movement of said plate, said plate being seated and unseated by the suction and pressure created by the strokes of the piston whereby the plate will be unseated on the upstroke of the piston to permit the passage of gases around the periphery of the plate between the cylinder and combustion chamber.

JOHN M. ROBERTSON.